(12) United States Patent
Unno

(10) Patent No.: US 7,528,501 B2
(45) Date of Patent: May 5, 2009

(54) VEHICLE CONTROLLER FOR STRADDLE TYPE VEHICLE

(75) Inventor: Hitoshi Unno, Shizuoka-ken (JP)

(73) Assignee: Yamaha Hatsudoki Kabushiki Kaisha, Shizouka-ken (JP)

( * ) Notice: Subject to any disclaimer, the term of this patent is extended or adjusted under 35 U.S.C. 154(b) by 0 days.

(21) Appl. No.: 11/419,393

(22) Filed: May 19, 2006

(65) Prior Publication Data

US 2006/0261675 A1 Nov. 23, 2006

(30) Foreign Application Priority Data

May 20, 2005 (JP) ............... 2005-148595

(51) Int. Cl.
*B60R 25/00* (2006.01)
(52) U.S. Cl. .................................... 307/10.2
(58) Field of Classification Search ............. 307/10.1, 307/10.2; 440/1; 180/287, 289; 340/426.17, 340/426.1
See application file for complete search history.

(56) References Cited

U.S. PATENT DOCUMENTS

| | | | |
|---|---|---|---|
| 4,853,504 A | 8/1989 | Tanaka et al. | |
| 4,941,854 A | 7/1990 | Takahashi et al. | |
| 5,319,698 A | 6/1994 | Glidewell et al. | |
| 5,343,077 A | 8/1994 | Yoshida et al. | |
| 5,593,330 A | 1/1997 | Kobayashi | |
| 5,623,245 A | 4/1997 | Gilmore | |
| 5,725,228 A | 3/1998 | Livingston | |
| 5,854,736 A | 12/1998 | Fuhs et al. | |
| 5,860,842 A | 1/1999 | Parr | |
| 5,965,955 A | 10/1999 | Takanohashi et al. | |
| 6,077,133 A | 6/2000 | Kojima et al. | |
| 6,125,782 A | 10/2000 | Takashima et al. | |
| 6,352,045 B1 | 3/2002 | Takashima | |
| 6,404,071 B1 | 6/2002 | Kurano | |
| 6,695,657 B2 | 2/2004 | Hattori | |
| 6,878,019 B2 | 4/2005 | Kanno et al. | |
| 6,889,654 B2 | 5/2005 | Ito | |
| 7,049,931 B2 * | 5/2006 | Hayashi et al. | ............ 340/5.61 |
| 2002/0053310 A1 | 5/2002 | Ibata et al. | |
| 2003/0089291 A1 | 5/2003 | Kanno et al. | |
| 2004/0164850 A1 | 8/2004 | Konno et al. | |

(Continued)

FOREIGN PATENT DOCUMENTS

DE    10125064 A1    11/2002

(Continued)

OTHER PUBLICATIONS

European Search Report; Sep. 4, 2006; two pages.

(Continued)

*Primary Examiner*—Stephen W Jackson
*Assistant Examiner*—Daniel Cavallari
(74) *Attorney, Agent, or Firm*—Knobbe, Martens, Olson & Bear, LLP

(57) ABSTRACT

The vehicle controller is provided with a portable transmitting device and an authentication system that receives and authenticates the signal. If the authentication is successful, power is supplied from a control unit to a steering lock and an encrypted signal is communicated between the control unit and the steering lock. If the encrypted signal is successfully authenticated, the steering lock is unlocked.

15 Claims, 5 Drawing Sheets

U.S. PATENT DOCUMENTS

| | | | |
|---|---|---|---|
| 2004/0198106 A1 | 10/2004 | Tsumiyama et al. | |
| 2004/0217897 A1* | 11/2004 | Hayashi et al. | 341/176 |
| 2004/0252014 A1* | 12/2004 | Emmerling et al. | 340/5.62 |
| 2005/0012590 A1* | 1/2005 | Metlitzky et al. | 340/5.21 |
| 2005/0029871 A1* | 2/2005 | Mori et al. | 307/10.3 |
| 2005/0234601 A1* | 10/2005 | Suzuki | 701/1 |
| 2005/0284436 A1* | 12/2005 | Takezoe | 123/179.2 |
| 2006/0087177 A1* | 4/2006 | Hata | 307/10.1 |
| 2006/0152348 A1* | 7/2006 | Ohtaki et al. | 340/426.1 |
| 2006/0244575 A1* | 11/2006 | Ramirez et al. | 340/426.35 |
| 2006/0261673 A1* | 11/2006 | Unno | 307/10.1 |
| 2006/0261674 A1* | 11/2006 | Unno | 307/10.1 |

FOREIGN PATENT DOCUMENTS

| | | |
|---|---|---|
| DE | 10203462 A1 | 7/2003 |
| EP | 1 069 012 A2 | 1/2001 |
| EP | 1108631 A | 6/2001 |
| EP | 1232918 A | 8/2002 |
| EP | 1504986 A | 2/2005 |
| EP | 1547912 A | 6/2005 |
| JP | 03021575 | 1/1991 |
| JP | 06247260 | 6/1994 |
| JP | 2001-254549 | 9/2001 |
| WO | WO 2005042317 A1 * | 5/2005 |

OTHER PUBLICATIONS

Photograph of Safety Lanyard Cap and Float from 2001 Seadoo RXD1.

SeaDoo 2003 shop Manual; pp. 1-7; @Bombardier Inc. 2003.

Copending U.S. Appl. No. 10/909,938, filed Aug. 2, 2004, entitled "Control Device fro Small Watercraft".

* cited by examiner

VEHICLE CONTROLLER FOR STRADDLE TYPE VEHICLE

CROSS-REFERENCE TO RELATED APPLICATIONS

This application claims the priority under 35 U.S.C. § 119(a)-(d) of Japanese Patent Application No. 2005-148595, filed on May 20, 2005, which is hereby incorporated by reference in its entirety.

BACKGROUND OF THE INVENTION

1. Field of the Invention

The present invention generally relates to a vehicle controller for a straddle type vehicle. More particularly, the present invention relates to a vehicle controller used to implement an antitheft function.

2. Description of the Related Art

For commonly used two-wheeled motor vehicles, engine start/stop and locking/unlocking of the steering have been performed by a mechanical key operation that involved inserting a key into a keyhole before key operation, which can be considered burdensome. Thus, a remote control system was proposed in which an owner of the vehicle would carry a portable transmitter (portable device) to transmit a signal to the vehicle to remotely control starting of the engine and unlocking of the steering system. This system would provide antitheft security by coding the signal transmitted to the vehicle and by authenticating the received encrypted signal with an authentication function installed on the vehicle.

Japanese Patent Document, JP-A-Hei 3-21575, disclosed a conventional authentication system. In this system, following successful authentication, a vehicle power circuit was switched-ON so that the engine could be started and so that the steering could be unlocked. An ignition switch and an unlocking switch could be manually operated once the power circuit was powered up and the two switches could start-up the engine and release the steering lock, respectively. In such a system, if authentication failed, the power circuit was not powered up. Thus, the engine would not start and the steering lock would not release the locked state. Thus, the system provided antitheft protection for the vehicle.

Japanese Patent Document, JP-A-Hei 6-247260, disclosed another authentication system. This system used a non-contact IC card. Upon successful authentication, the steering lock was released and the engine was able to be started. In this system, the engine enabling components and the steering lock release mechanism were all accommodated in a rigid steering lock unit, thereby preventing from engine start-up by an unauthenticated driver.

SUMMARY OF THE INVENTION

In the system described by Japanese Patent Document JP-A-Hei 3-21575, if authentication was successful, the engine start circuit and the unlock actuator, such as the steering lock, were able to be operated. But manual operation of the starting switch and manual operation of the release switch were necessary for engine start-up and release of the steering lock, respectively. Thus, in order to move the vehicle without starting the engine, such as during maintenance or the like, the steering lock must be manually operated to enable the vehicle to be steered after successful authentication. This manual unlocking can be burdensome, especially where several vehicles require movement.

In the system described by Japanese Patent Document JP-A-Hei 6-247260, if authentication was successful, the steering lock was released, which is less burdensome than the arrangement described above. However, in order to enhance security, the engine enabled state setting configuration should be accommodated in the steering lock unit. Such an arrangement increases the size of the unit, which is disadvantageous.

In view of these problems, a vehicle controller is desired for a straddle type vehicle, which controller offers improved maintenance convenience and improved security for vehicle.

One aspect of the present invention involves a vehicle controller for a straddle type vehicle. The vehicle controller comprises a control unit in communication with a steering lock mechanism. A power supply is electrically connectable to the control unit and the steering lock mechanism. A portable transmitting device is adapted to transmit a first signal. The control unit comprises a receiver adapted to receive the first signal and an authentication system adapted to authenticate the first signal. If the first signal is authenticated then power is supplied from the control unit to the steering lock mechanism and an encrypted signal is transmitted from the steering lock to the control unit, and if the encrypted signal is authenticated then an unlocking mechanism of the steering lock unit is actuated to unlock the steering lock.

Another aspect of the present invention involves a method of securing a vehicle with a vehicle controller. The method comprises providing a portable transmitter adapted to transmit a code signal, receiving the code signal with a receiver, authenticating the received code signal, supplying power to a steering lock mechanism if the code signal is properly authenticated, transmitting an encrypted signal to the vehicle controller upon power supply to the steering lock mechanism, authenticating the encrypted signal and unlocking the steering lock mechanism if the encrypted signal is properly authenticated.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
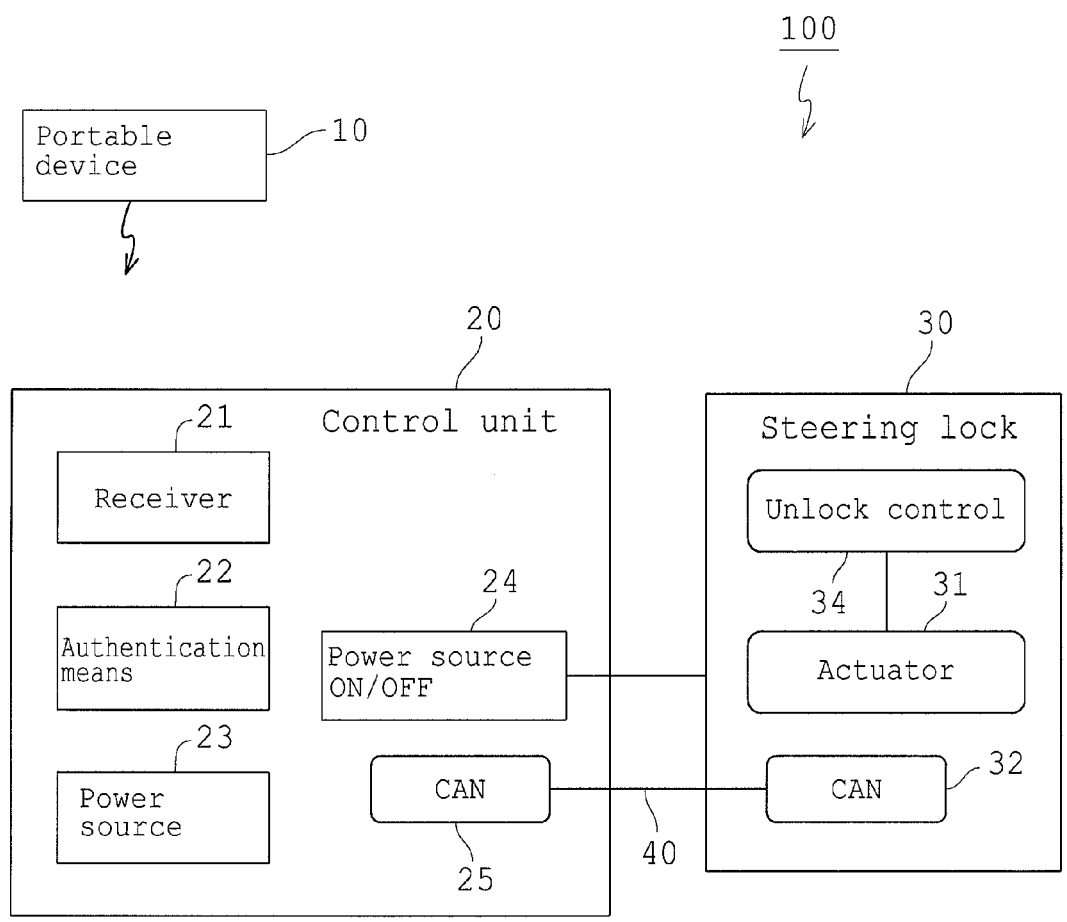
FIG. 1 is a block diagram illustrating a basic configuration of a vehicle controller for a two-wheeled motor vehicle, which controller is arranged and configured in accordance with certain features, aspects and advantages of the present invention.

Embodiments of the present invention are described below with reference to the drawings. In the drawings and the following discussion, for the sake of simplifying the explanation, like components are indicated with the same reference numeral. Further, the present invention is not limited to the following embodiment.

With reference in initially to FIG. 1, a basic configuration of a vehicle controller 100 for a two-wheeled motor vehicle is presented in block diagram form. The illustrated controller 100 advantageously is arranged and configured in accordance with certain features, aspects and advantages of the present invention.

The illustrated vehicle controller 100 comprises a suitable authentication system. In the illustrated configuration, the authentication system comprises a portable device 10 that a rider carries, a receiver 21 installed in the vehicle and an authentication system 22. The portable device 10 transmits a code signal. The receiver 21 receives the code signal. The authentication system 22 identifies the received code signal to determine whether or not a rider is authorized to move or otherwise operate the vehicle.

A non-contact IC card, a remote control switch or other suitable components may be used as the portable device 10. In the case of a non-contact IC card, the code signal preferably is stored in the non-contact IC card in advance. The IC card can be brought proximate the receiver 21 to emit the code signal, which is transmitted to the authentication system 22 for code identification. In the case of a remote control switch, an infrared signal corresponding to the code signal is transmitted to the receiver 21 by operation of the switch. Once the code signal is received, the code signal is transmitted to the authentication system 22 for code identification.

In the illustrated authentication system, if code authentication is successful, power is supplied (e.g., a power source 24 or other power flow controlling feature is turned to an ON position) from the control unit 20 to the steering lock 30 and an encrypted signal is sent between the control unit 20 and the steering lock 30. The encrypted signal preferably is sent from the control unit 20 to the steering lock 30. In one configuration, the encrypted signal is sent via a communication line 40. Other arrangements also can be used keeping in mind the desire for security of the overall system. If the encrypted signal is successfully authenticated, an unlock control section 34 of the steering lock actuates an unlock actuator 31 for the steering lock 30 to unlock the steering lock 30.

In one configuration, the communication line 40 can form a portion of any suitable controller area network (CAN) system. In some configurations, a less costly serial communication system can be used. In systems employing a CAN system, unlocking of the steering lock 30 is facilitated by the CAN system. Should wiring fault occur in the unlock actuator 31 for the steering lock 30, identification using the CAN system is not allowed. Thus, the steering lock 30 is disabled from unauthorized unlocking. This can improve the security provided by the vehicle antitheft system.

In addition, an authenticated user can unlock the steering lock without starting the engine. Thus, the vehicle can be moved without starting the engine. This facilitates maintenance and other work.

Now, a vehicle control method using the vehicle controller 100 of FIG. 1 will be described with reference to a flowchart shown in FIG. 2.

Figure 2:
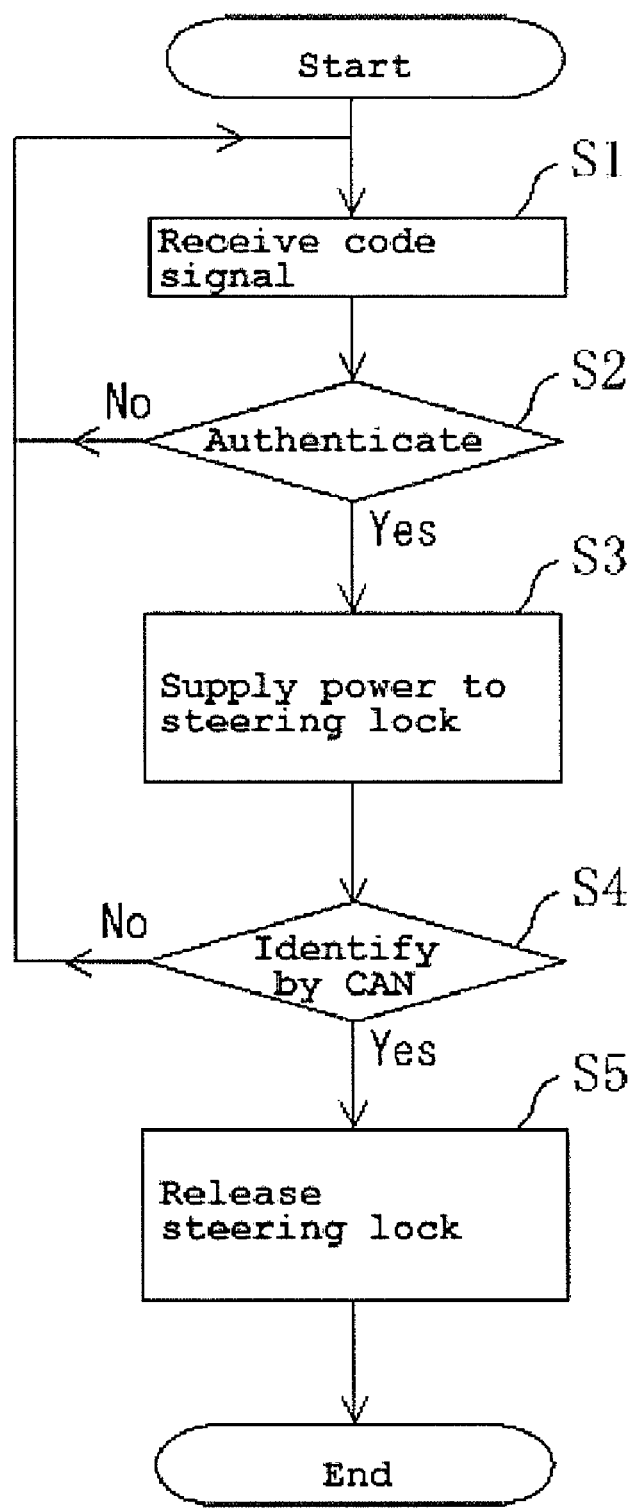
FIG. 2 is a flow chart illustrating a vehicle control method using the vehicle controller of FIG. 1.

With reference now to FIG. 2, a flowchart of a vehicle control method is illustrated therein. Initially, a code signal is transmitted from the portable device 10 carried by a rider. The code signal is received by the receiver 21 provided on the vehicle (S1). The receiver identifies the code signal with a reference code preset by the authentication system 22 (S2).

If the code signal is successfully authenticated, which means the rider has been identified as possessing an authorized portable device 10, power is supplied from the control unit 20 to the steering lock 30 (S3) and an encrypted signal is identified using the CAN system or any other suitable system that connects the control unit 20 and the steering lock 30 (S4). If the encrypted signal is successfully authenticated, the steering lock 30 is unlocked (S5). These conditions allow the rider to move the vehicle, so that the rider can start vehicle inspection, maintenance or other work immediately. It should be understood that if either authentication fails, the steering lock 30 remains locked, thus providing antitheft protection for the vehicle.

Figure 3:
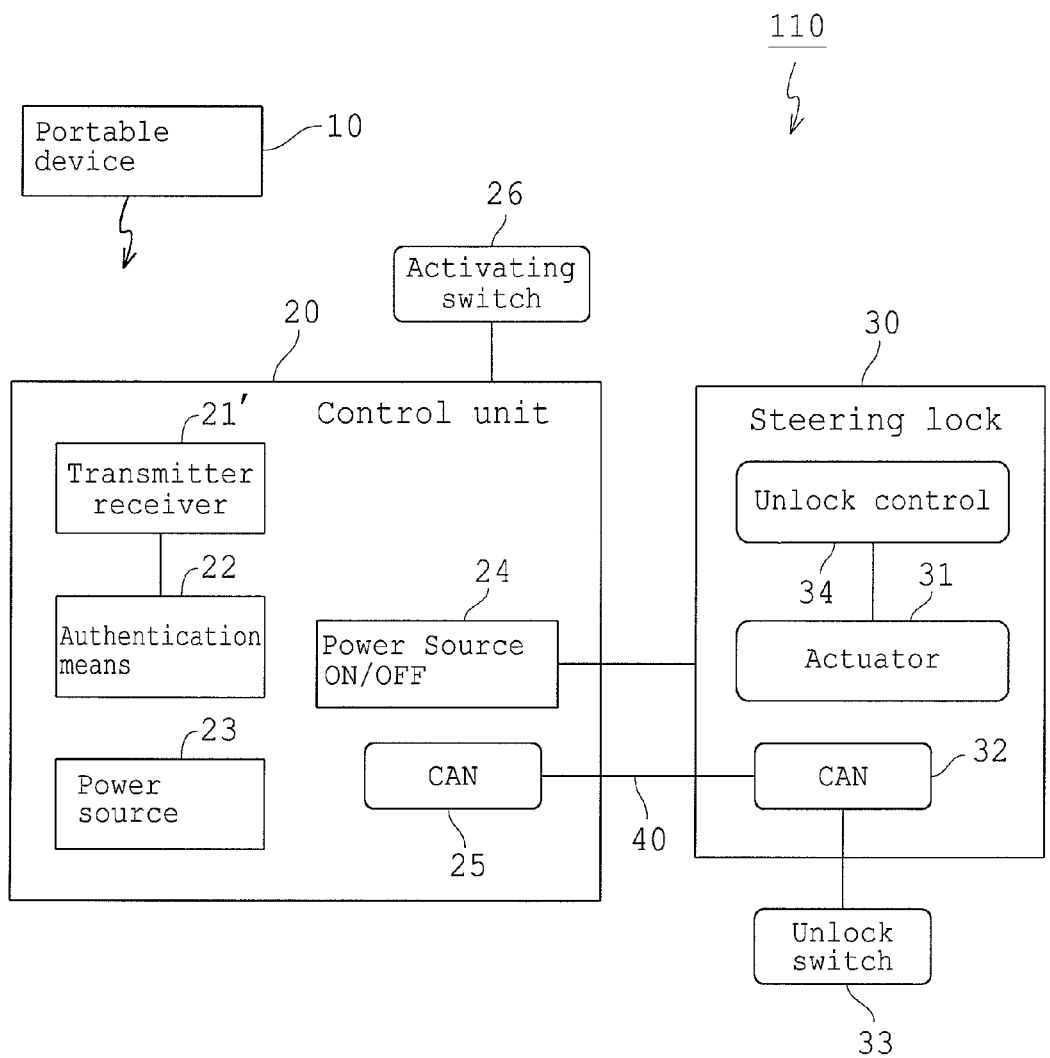
FIG. 3 is a block diagram illustrating a basic configuration of a vehicle controller for a two-wheeled motor vehicle, which controller is arranged and configured in accordance with certain features aspects and advantages of the present invention.

With reference now to FIG. 3, another vehicle controller 110 arranged and configured in accordance with certain features, aspects and advantages of the present invention is illustrated therein in a block diagram. The illustrated vehicle controller 110 comprises an authentication system. The illustrated authentication system polls the portable device 10 in this configuration. In other words, when a vehicle activating switch 26, which is mounted on the vehicle, is manipulated to turn a power source 23 of the control unit 20 to ON, a request signal is transmitted from the transmitter-receiver 21' to the portable device 10 that the rider carries. In response to the request signal, the portable device 10 issues a code signal, which is received by the transmitter-receiver 21'. The code signal is identified by the authentication system 22. The authentication system 22 evaluates whether or not the rider is in possession of the correct portable device 10 for the vehicle. In one configuration, the vehicle may constantly issue a code signal, instead of transmitting a request signal, and the portable device responds with a code signal when it is brought into range of the code signal issued by the vehicle.

In the configuration of FIG. 3, the portable device 10 need not be brought close to the receiver 21 in the manner commonly encountered with non-contact IC cards and a switch need not be operated in the manner commonly encountered with a remote control switch. Thus, the portable device in the configuration of FIG. 3 need not be taken out for every use. Thus, in the configuration featuring the activating switch, a rider carrying the portable device 10 in his/her pocket or the like can simply operate the activating switch mounted to the vehicle to obtain high security authentication, whereby excellent usability is achieved. In arrangements featuring a constant code signal issued by the vehicle, the rider need only move into sufficient proximity of the vehicle.

In the illustrated authentication system, if code authentication is successful, power is supplied (e.g., the power source 24 is turned ON or the like) from the control unit 20 to the steering lock 30. By operation of the unlock switch 33, an encrypted signal can be transmitted between the control unit 20 and the steering lock 30. The encrypted signal preferably is sent from the control unit 20 to the steering lock 30. As described above, the signal can be conducted via the communication line 40. If authentication of the encrypted signal is successful, the unlock control section 34 of the steering lock actuates the unlock actuator 31 for the steering lock 30 to unlock the steering lock.

As described above, the encrypted signal identification system can use the CAN system or can use a less costly serial communication system. Thus, should a wiring fault occur in the unlock actuator 31 for the steering lock 30, the likelihood of unauthorized unlocking of the steering lock 30 can be greatly reduced, thereby improving the security afforded by the vehicle antitheft system. If the proper identification occurs, the steering lock can be unlocked without starting the engine. Thus, the vehicle can be pushed and steered by an authorized individual. Such a configuration facilitates maintenance and other work. Further, unlock of the steering lock 30 can be activated with the unlock switch 33, which can be operated depending on the rider's intent, thereby further improving security of the vehicle antitheft system.

Figure 4:
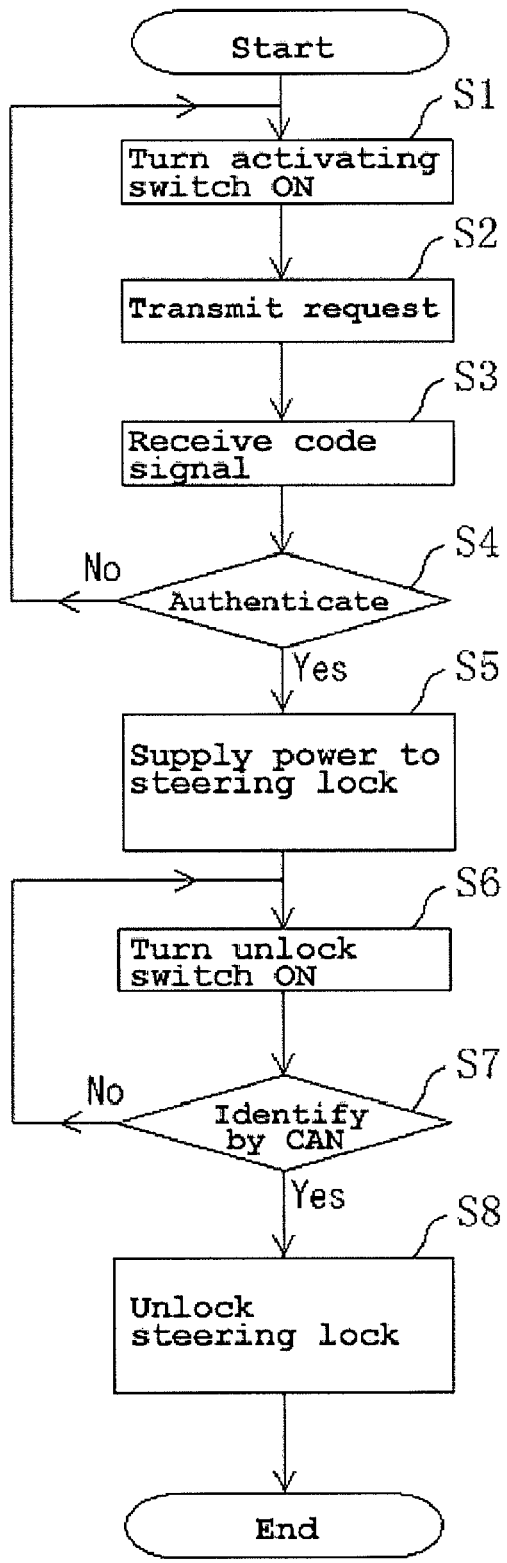
FIG. 4 is a flow chart illustrating a vehicle control method using the vehicle controller of FIG. 3.

With reference now to FIG. 4, a method of using the vehicle controller 110 of FIG. 3 is illustrated therein. As described in FIG. 4, a rider manipulates the activating switch 26 provided on the vehicle (S1) to supply power from the power source 23 of the control unit 20 as well as to issue a request signal from a transmitter-receiver 21' provided on the vehicle (S2). Upon reception of the request signal, the portable device 10 carried by the rider responds by automatically sending a code signal. The transmitter-receiver 21' provided on the vehicle receives the code signal (S3) and authenticates the signal with a specific reference code preset by the authentication system 22 (S4).

If authentication is successful, power is supplied to the steering lock 30 (S5). With power supplied, the unlock switch 33 is operated (S6) and the encrypted signal is identified using the CAN system between the control unit 20 and the steering lock 30 preferably via the communication line 40 (S7). If authentication is successful, the steering lock 30 is unlocked (S8). These conditions allow the rider to move the vehicle, so that the rider can start vehicle inspection, maintenance or other work immediately. If authentication fails, the steering lock 30 remains locked, thus providing antitheft protection for the vehicle.

Figure 5:
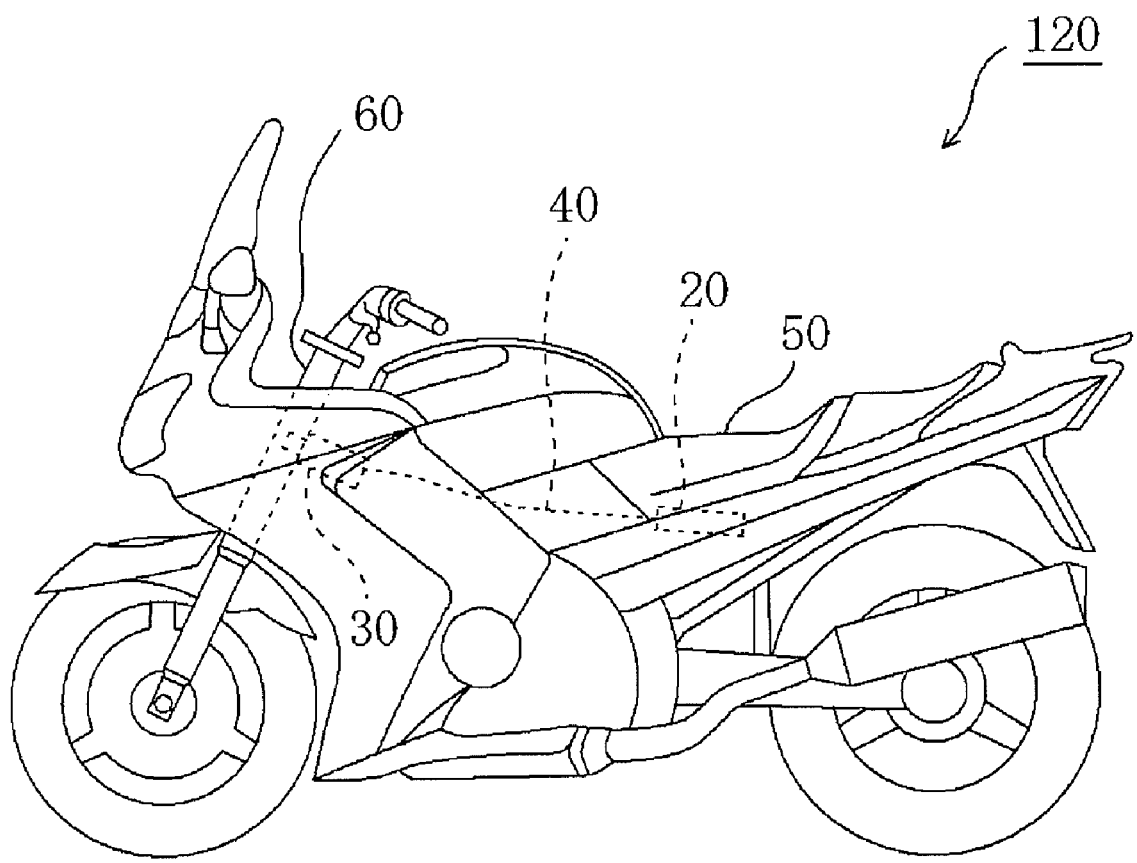
FIG. 5 illustrates an example in which a vehicle controller for a two-wheeled motor vehicle is mounted to the vehicle.

Any of the above-described configurations can be installed on a suitable vehicle. For instance, FIG. 5 illustrates an example in which one of the vehicle controllers 100, 110 is installed on a two-wheeled motor vehicle 120. As illustrated, the control unit 20 and the steering lock 30 can be configured as separate components that are separately mounted, which can improve layout flexibility in the vehicle. In the example illustrated in FIG. 5, the control unit 20 is located within a vacant area defined below a seat 50 while the steering lock 30 is located adjacent to handlebars 60. The control unit 20 and the steering lock 30 can communicate with each other in any suitable manner. Preferably, the control unit 20 and the steering lock 30 are connected to each other via the communication line 40 that forms at least a portion of the CAN system or that forms a portion of a serial communication system.

One implementation of the vehicle controller 110 shown in FIG. 3 involves operation of the activating switch 26 and of the unlock switch 33 respectively to activate the control unit 20 and to unlock the steering lock 30 after authentication of the rider. These switches can be combined into one mechanism such that the ease of operation can be improved. To be more specific, a two-stage switch (e.g., a two-stage push button or toggle switch) may be adopted, which switch is designed to function as an activating switch when manipulated to a first position or as an unlock switch when manipulated into a second position.

As used herein, "two-wheeled motor vehicle" has its ordinary meaning and also means a motorcycle, motor bike, motor scooter and the like. Such vehicles often can be turned by tilting the vehicle body; however, such vehicles can also be equipped with two or more front wheels and/or two or more rear wheels, thus having three or four (or more) wheels, such as would be defined as an "autobicycle." The present invention also may be applied to other vehicles, as long as a vehicle can take advantage of effects of the invention. Thus, certain features, aspects and advantages of the present invention can be used with other straddle type vehicles, such as four-wheeled buggies or all terrain vehicles (ATV) and snowmobiles.

Although the present invention has been described in terms of certain embodiments and implementations, other embodiments and implementations apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle controller for a straddle type vehicle comprising:
   a control unit in communication with a steering lock unit;
   a power supply electrically connected to said control unit and said steering lock unit;
   a portable transmitting device adapted to transmit a first signal;
   said control unit comprising a receiver adapted to receive said first signal and an authentication system adapted to authenticate said first signal, wherein if said first signal is authenticated then power is supplied from said control unit to said steering lock unit and an encrypted signal is transmitted between said steering lock unit and said control unit, and if said encrypted signal is authenticated then an unlocking mechanism of said steering lock unit is actuated to unlock a steering lock.

2. The vehicle controller for a straddle type vehicle according to claim 1, wherein the vehicle controller also comprises a vehicle activation switch and said portable device is adapted to transmit said first signal upon receiving a request signal transmitted from the vehicle through operation of said activating switch.

3. The vehicle controller for a straddle type vehicle according to claim 1, wherein the unlocking mechanism comprises an actuator.

4. A method of securing a vehicle with a vehicle controller, the method comprising providing a portable transmitter adapted to transmit a code signal, receiving the code signal with a receiver, authenticating the received code signal, supplying power to a steering lock unit only if the received code signal is properly authenticated, transmitting an encrypted signal between said vehicle controller and said steering lock unit upon power supply to said steering lock unit, authenticating said encrypted signal and unlocking a steering lock mechanism of said steering lock unit if said encrypted signal is properly authenticated.

5. The method of claim 4, wherein said portable transmitter transmits the code signal only after being polled.

6. The method of claim 5, wherein said portable transmitter is polled by a signal transmitted by said vehicle controller.

7. The method of claim 4, wherein unlocking said steering lock mechanism is automatically performed by said vehicle controller.

8. The method of claim 4, wherein unlocking said steering lock mechanism comprises a manual user operation.

9. A vehicle control system for a straddle type vehicle, the vehicle control system comprising:
   a portable device, said portable device communicating with a control unit, and said control unit communicating with a steering lock unit;
   said portable device adapted to transmit a code signal;
   said control unit comprising a receiver, said receiver adapted to receive the code signal;
   said control unit also comprising an authentication system, said authentication system adapted to identify the received code signal;

said steering lock unit receiving power and an encrypted signal from said control unit only upon proper identification by the control unit of the received code signal, said steering lock unit comprising an unlocking actuator, and said unlocking actuator adapted to unlock a steering component of a vehicle upon proper authentication by the steering lock unit of the encrypted signal.

10. The vehicle control system of claim 9, wherein the steering lock unit further comprises a unlock control component, said unlock control component adapted to actuate said unlocking actuator.

11. The vehicle control system of claim 9 further comprising a communication line extending between the control unit and the steering lock unit.

12. The vehicle control system of claim 11, wherein said communication line forms a portion of a controller area network system.

13. The vehicle control system of claim 9 further comprising an activation switch, said activation switch adapted to power up said control unit.

14. The vehicle control system of claim 13, wherein said control unit issues a request signal when said control unit is powered up.

15. The vehicle control system of claim 14, wherein the portable device is adapted to transmit the code signal in response to the request signal.

\* \* \* \* \*

UNITED STATES PATENT AND TRADEMARK OFFICE
CERTIFICATE OF CORRECTION

| | | |
|---|---|---|
| PATENT NO. | : 7,528,501 B2 | Page 1 of 1 |
| APPLICATION NO. | : 11/419393 | |
| DATED | : May 5, 2009 | |
| INVENTOR(S) | : Hitoshi Unno | |

It is certified that error appears in the above-identified patent and that said Letters Patent is hereby corrected as shown below:

On the title page item 73, Line 2, please change "Shizouka-ken" to --Shizuoka-ken--.

At column 3, line 35, please change "signa 1" to --signal--.

At column 4, line 50, please change "signa l" to --signal--.

Signed and Sealed this

Twenty-fourth Day of November, 2009

David J. Kappos
*Director of the United States Patent and Trademark Office*